(No Model.)
J. McNAB.
PROCESS OF FILTERING.
No. 412,780. Patented Oct. 15, 1889.
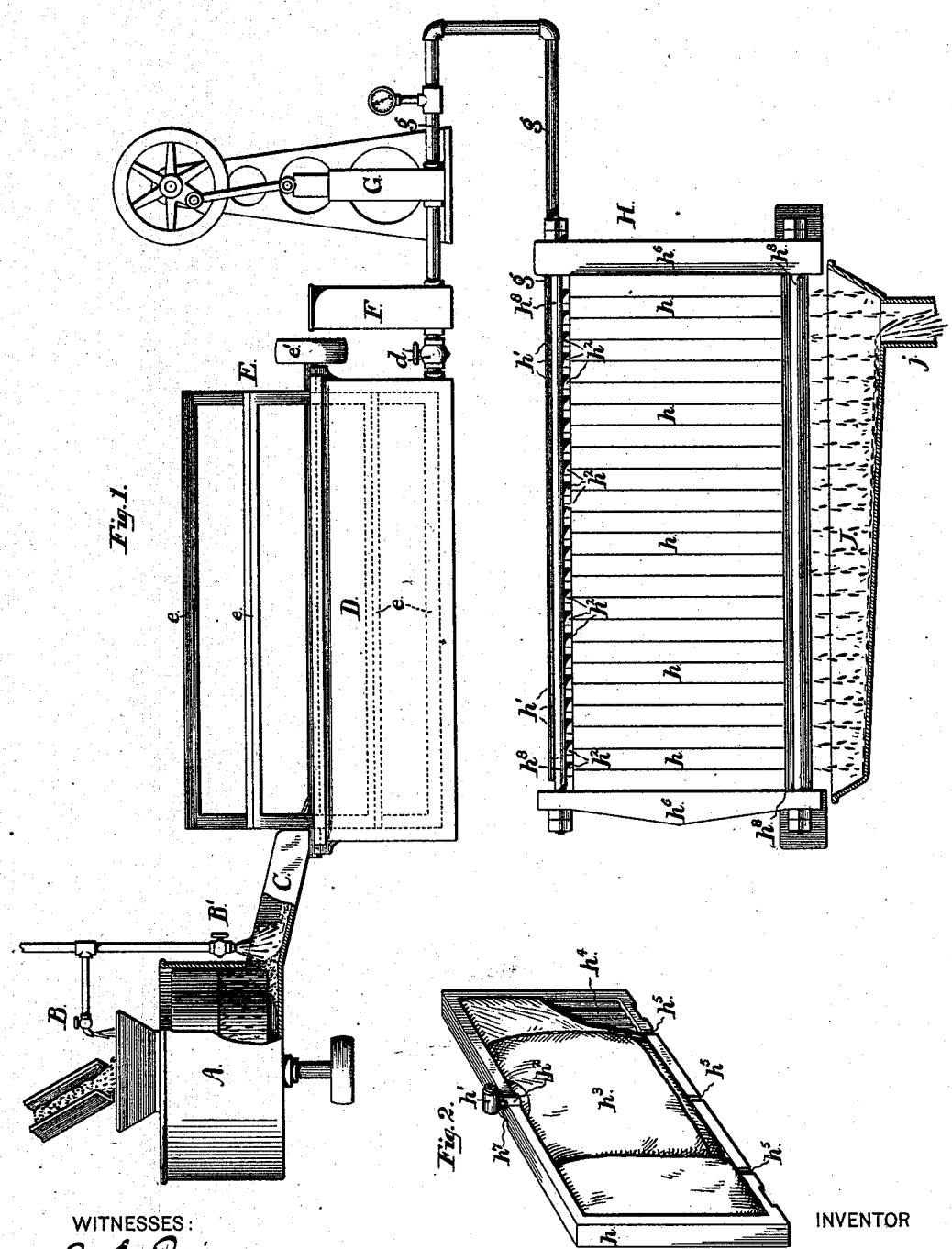
WITNESSES:
A. E. Paige
O. B. Morris
INVENTOR
James McNab
by his attorney
Francis T. Chambers

UNITED STATES PATENT OFFICE.

JAMES McNAB, OF CAMDEN, NEW JERSEY, ASSIGNOR TO THE UNITED STATES CHEMICAL COMPANY, OF SAME PLACE.

PROCESS OF FILTERING.

SPECIFICATION forming part of Letters Patent No. 412,780, dated October 15, 1889.

Application filed June 25, 1887. Serial No. 242,447. (No model.)

*To all whom it may concern:*

Be it known that I, JAMES MCNAB, a citizen of the United States, residing in Camden, county of Camden, State of New Jersey, have invented a new and useful Improved Leaching and Filtering Process, of which the following is a true and exact description, reference being had to the drawings which accompany and form part of this specification.

My invention relates to the treatment of mixed masses of soluble and insoluble salts for the purpose of separating and recovering the soluble material, and especially to the treatment of the mass of sulphate of calcium and acid phosphate of calcium obtained by treating bone-black with sulphuric acid; and my object is to separate the acid phosphate of calcium from the insoluble sulphate of calcium more rapidly, cheaply, and thoroughly than has heretofore been practicable. The same treatment may of course be applied to similar mixtures of soluble and insoluble material with the same advantage.

Reference is now had to the drawings, which show an apparatus especially designed and adapted for carrying out my improved process, and which said apparatus forms the subject-matter of another application for Letters Patent, and is here referred to only for the purpose of more easily explaining my process.

Figure 1 is a view or diagram of an apparatus or plant such as I prefer to use in carrying out my process; Fig. 2, a perspective view for a portion of the filtering-press shown in Fig. 1, said view illustrating the interior construction and parts of the said press.

A is a grinding-mill of ordinary construction; B and B', water-cocks; C, a conduit leading from the mill A and into an agitating-tank D, which said tank is provided with a revolving stirrer E, having blades $e\ e$, and a pulley or other device for driving it $e'$.

$d$ is the exit pipe or conduit leading from the agitating-tank D to a force-pump G, a trap-tank F being preferably situated in this conduit to intercept light impurities and prevent them from entering the pump.

$g$ is a conduit leading from the force-pump G to a filtering-press H. This filtering-press is made up of a number of wooden frames $h$, with slightly-depressed and preferably corrugated central panels $h^4$, each of such frames having secured to it a bag $h^3$, made of fibrous material, and having a pipe $h^2$ leading into it through the top of the frames $h$, these pipes $h^2$ terminating in cross-pipes $h'$, which run at right angles to the frames $h$, and are arranged to fit into or against each other and form a tight conduit or pipe when the frames $h$ are clamped together, as shown in Fig. 1, said conduit or pipe made up of the short pipes $h'$, forming practically a continuation of the pipe or conduit $g$. The frames $h$ are clamped together by means of the bolts or rods $h^8$ and end braces $h^6$. Beneath the filtering-press H a drop-pan J is provided, and holes $h^5$ should be made in the bottom of the frames $h$ to permit the free egress of any fluid escaping through the bags $h^3$.

By the aid of the above-described drawings my improved process can be readily understood. In the first place, I subject the thick mass of sulphate of calcium and acid phosphate of calcium as it comes from the mixing-tubs to a thorough grinding treatment to break up all masses and lumps and insure the fine division and comminution of the mass, and in this treatment I add water in sufficient quantity to make a thick pasty mass. I then conduct the homogeneous and finely-ground mass into an agitating-tank, where sufficient water is added to it to thoroughly dissolve out all of the soluble acid phosphate and to form a thoroughly liquid mixture with the sulphate of calcium, which, by means of stirring-arms or other agitating devices, is kept, while in the agitating tank, in a state of complete, thorough, and homogeneous admixture with the water. After the mass has been treated in the agitating-tank long enough for the water to completely dissolve all of the acid phosphate, the mixture is drawn off and forced, by means of a force-pump, into the fibrous bags of a filtering-press in which, by means of the pressure exerted by the pump, the solution of acid phosphate is expressed and separated from the insoluble sulphate of calcium.

Having now described my invention, what I claim as new, and desire to secure by Letters Patent, is—

A process of leaching and filtering out a soluble salt from a mixed mass of soluble and insoluble material, which consists in grinding the mass together with water in sufficient quantity to make a thick homogeneous paste, in subjecting the ground mass mixed with additional water in sufficient quantity to dissolve the soluble portions and form a thoroughly-fluid homogeneous mixture with the insoluble material to treatment in an agitating-tank, and then forcing the homogeneous mixture into the fibrous bags of a filtering-press by means of a force-pump, so as to express all of the solution and separate it from the insoluble material.

JAMES McNAB.

Witnesses:
FRANK A. MULLIKIN,
JOSHUA MATLACK, Jr.